I. S. WILLIAMS.
Army Cooking Stove.
No. 34,385.  Patented Feb. 11, 1862.
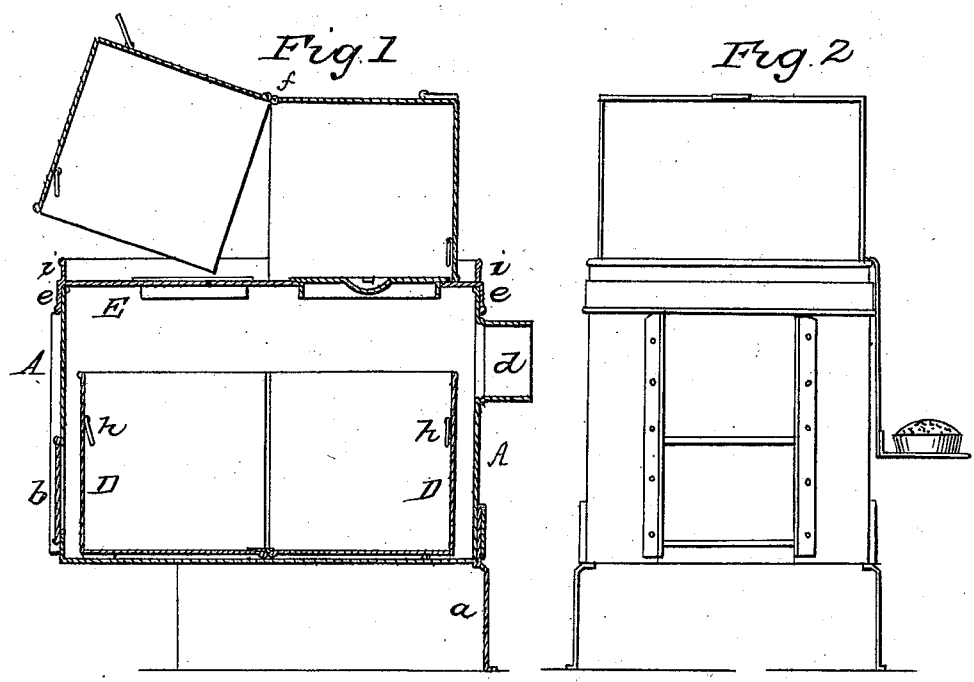
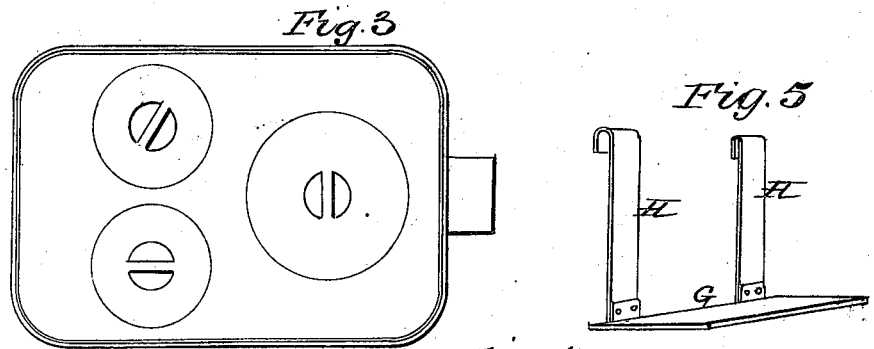
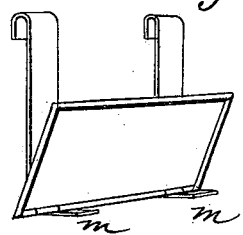
Witness
Charles E. Foster
Inventor
I. S. Williams
per Henry Howson
Atty

UNITED STATES PATENT OFFICE.

ISAAC S. WILLIAMS, OF PHILADELPHIA, PENNSYLVANIA.

IMPROVEMENT IN CAMP-STOVES.

Specification forming part of Letters Patent No. 34,385, dated February 11, 1862.

*To all whom it may concern:*

Be it known that I, ISAAC S. WILLIAMS, of Philadelphia, Pennsylvania, have invented a Cooking-Stove for Army Use; and I do hereby declare the following to be a full, clear, and exact description of the same, reference being had to the accompanying drawings, and to the letters of reference marked thereon.

My invention consists in an outer casing, an inner casing composed of two pieces hinged to each other, and a detachable cover with two flanges, the whole being constructed and arranged in the manner described hereinafter, so that the several parts combined may be used either as a chest, a stove, or an oven, and in a folding shelf constructed and arranged for suspension to the edge of the cover, and for the reception of articles of diet, cooking utensils, &c.

In order to enable others to make and use my invention, I will now proceed to describe its construction and operation.

On reference to the accompanying drawings, which form a part of this specification, Figure 1 is a vertical section of my improved cooking-stove for camps; Fig. 2, a transverse vertical section; Fig. 3, a ground plan; and Figs. 4 and 5 detached views of the folding shelf.

Similar letters refer to similar parts throughout the several views.

The exterior sheet-iron casing A of the stove is of the oblong form represented, and is provided with the detachable legs $a\ a$, and at the front end of the stove is a sliding door $b$, for the opening through which fuel is admitted to the interior of the casing, and at the rear end of the stove is the usual opening $d$ for the escape of the products of combustion to the chimney.

E is a sheet-iron cover having on the edge an upper flange $i$ and lower flange $e$, the latter being arranged to fit snugly over, but so that the cover can be readily detached from, the upper edge of the casing A, the cover having the usual holes for receiving the cooking utensils.

Within the casing A is an inner casing D, which is of such a form and size that when removed from the outer casing by means of suitable rings $h\ h$ and inverted and placed on the cover of the stove it will be confined to its proper position by the upper flange $i$ of the said cover, as shown in Fig. 1.

G is a shelf, to which are hinged the two vertical plates H and H′, the latter being bent at the top so as to fit over and be suspended to the upper flange $i$ of the cover E, and provided at the bottom with projections $m$, which serve to maintain the shelf in a horizontal position.

When the stove has to be used for cooking purposes, the cover E is detached, the inner casing D removed from the outer casing, the cover replaced, and the legs $a\ a$ fitted to their proper places, after which the stove is ready for receiving the fuel.

When bread or other articles of diet have to be baked, they are deposited in the top of the cover E, and the inverted casing D is placed over them, thus forming an efficient oven. In order to allow for the admission of more or less air to this oven, the casing D is made in two halves hinged together at $f$, so that one or the other half may be raised at pleasure.

One, two, or more of the shelves shown in Figs. 4 and 5 may be suspended to the upper flange $i$, and on these shelves may be arranged such cooked articles of diet as it may be desirable to keep hot, or vessels for warming tea, coffee, or for boiling vegetables, &c.

When the stove has to be removed from place to place or has to be prepared for accompanying a marching regiment, the cover E is detached from the casing A, the fuel and ashes removed from the latter, and the casing D, which had previously served as an oven, is inverted and placed within the said casing A. The legs $a$ are then detached, the shelves G removed from the sides of the stoves and folded against the suspension-plates H and H′; so that the whole may occupy as small a space as possible.

The interior of the stove, of which the casing D now forms a cleanly lining, may be used as a receptacle for groceries and other stores, as well as for receiving the folding shelf or shelves G, the legs $a\ a$, a variety of cooking utensils, as well as several lengths of stovepiping, after which the cover E may be replaced, and the whole is ready for transportation.

I claim as my invention, and desire to secure by Letters Patent—

1. The outer casing A, the inner casing D, the latter being composed of two pieces hinged to each other, as set forth, in combination with the cover E, its upper flange $i$ and lower flange $e$, the whole being constructed and arranged as set forth, for the purpose specified.

2. The shelf G and the plates H and H', with their hooked ends, and projections $m$, the whole being constructed and arranged for suspension to the flange $i$ of the cover, as and for the purpose herein set forth.

In testimony whereof I have signed my name to this specification in the presence of two subscribing witnesses.

ISAAC S. WILLIAMS.

Witnesses:
 JOHN WHITE,
 CHARLES E. FOSTER.